(12) United States Patent  
Herman et al.

(10) Patent No.: US 7,510,638 B2
(45) Date of Patent: Mar. 31, 2009

(54) METHOD OF ELECTRIC FIELD ASSISTED DEPOSITION OF FILMS OF NANOPARTICLES

(75) Inventors: Irving P. Herman, Yorktown Heights, NY (US); Mohammad A. Islam, State College, PA (US)

(73) Assignee: The Trustees of Columbia University in the city of New York, New York, NY (US)

( * ) Notice: Subject to any disclaimer, the term of this patent is extended or adjusted under 35 U.S.C. 154(b) by 840 days.

(21) Appl. No.: 10/974,406

(22) Filed: Oct. 27, 2004

(65) Prior Publication Data

US 2006/0032755 A1   Feb. 16, 2006

Related U.S. Application Data

(63) Continuation of application No. PCT/US02/14593, filed on May 10, 2002.

(51) Int. Cl.
    *C25D 13/02* (2006.01)
(52) U.S. Cl. ..................................... 204/490
(58) Field of Classification Search ................. 204/490
    See application file for complete search history.

(56) References Cited

U.S. PATENT DOCUMENTS

| | | | | |
|---|---|---|---|---|
| 5,296,117 A | * | 3/1994 | De Jaeger et al. | 204/486 |
| 6,060,026 A | | 5/2000 | Goldstein | 422/186 |
| 6,441,881 B1 | * | 8/2002 | Enomoto et al. | 349/156 |
| 6,582,673 B1 | | 6/2003 | Chow et al. | 423/445 |
| 7,170,670 B2 | * | 1/2007 | Webber | 359/296 |

2003/0089611 A1   5/2003   Nayfeh et al.

OTHER PUBLICATIONS

Zhang et al. (1999) "Electrodeposited quantum dots: metastable rocksalt CdSe nanocrystals on [111] gold alloys", Adv. Mater. 11(17): 1437-1441.

Shim et al. (1999) "Permanent dipole moment and charges in colloidal semiconductor quantum dots", J. Chem. Phys. 111(15): 6955-6964.

Blanton et al. (1997) "Dielectric dispersion measurements of CdSe nanocrystal colloids: observation of a permanent dipole moment", Phys. Rev. Lett. 79(5): 865-868.

Peng et al. (1997) "Epitaxial growth of highly luminescent CdSe/CdS core/shell nanocrystals with photostability and electronic accessibility", J. Am. Chem. Soc. 119: 7019-7029.

(Continued)

*Primary Examiner*—Kishor Mayekar
(74) *Attorney, Agent, or Firm*—Baker Botts LLP

(57) ABSTRACT

The present invention is directed to a method for depositing unpatterned or selectively patterned nanoparticle films of controlled thickness on the respective film deposition surface of each of a pair of electrodes. In the present method, a pair of electrodes, each having a conducting film deposition surface, are immersed in a non-conducting nonpolar solvent in which nanoparticles, each having ligands attached thereto, are suspended. A voltage is applied to the pair of electrodes thereby causing films of the nanoparticles to deposit on the respective film deposition surface of each of the pair of electrodes. The nanoparticle films formed by the present method may be unpatterned or they may be patterned by patterning the conducting film deposition surface of at least one electrode of the pair of electrodes. The nanoparticle films formed according to the method of the present invention are useful as layers in electronic devices.

29 Claims, 12 Drawing Sheets

OTHER PUBLICATIONS

Nicholson et al. (1996) "Producing ceramic laminate composites by EPD", The American Cerami Society Bulletin 75(11): 48-51.

Kagan et al. (1996) "Electronic energy transfer in CdSe quantum dot solids", Phys. Rev. Lett. 76: 1517-1520.

Murray et al. (1993) "Synthesis and characterization of nearly monodisperse CdE (E=S, Se, Te) semiconductor nanocrystallites", J. Am. Chem. Soc., 115(19): 8706-8715.

* cited by examiner

METHOD OF ELECTRIC FIELD ASSISTED DEPOSITION OF FILMS OF NANOPARTICLES

CROSS REFERENCE TO RELATED APPLICATION

The present application is a continuation of International Patent Application No. PCT/US02/014593, filed May 10, 2002, published on Apr. 22, 2004 as International Patent Publication No. WO 04/034421, the contents of which is hereby incorporated by reference in its entirety herein.

This invention was made with government support under Award Number DMR-9809687, awarded by the National Science Foundation. Therefore, the government has certain rights in the invention.

FIELD OF THE INVENTION

The present invention generally relates to a process for depositing unpatterned or selectively patterned films of nanoparticles. More particularly, the present invention relates to a method of depositing unpatterned and patterned nanoparticle films of controlled thickness on respective conducting film deposition surfaces of a pair of electrodes immersed in a substantially non-conducting nonpolar solvent in which the nanoparticles are suspended and where a voltage is applied between the respective film deposition surfaces of the pair of electrodes.

BACKGROUND OF THE INVENTION

Nanoparticle films are useful as building blocks for complex structures and devices; thus, it is desirable to create improved methods of forming high quality, robust nanoparticle films. Although various methods are known in the art for forming nanoparticle films, such methods are unable to provide robust patterned nanoparticle films of controllable thickness free of gaps and having a high degree of surface smoothness and uniformity.

Nanoparticle films have been deposited using electrophoresis, where a pair of electrodes having a voltage applied therebetween are immersed in a polar solvent having nanoparticles suspended therein. A nanoparticle film is formed on a surface of one of the electrodes. The nanoparticle films that are formed by electrophoresis are of a poor quality in that the films tend not to be continuous and are limited to a monolayer of nanoparticles in thickness. Moreover, such films are not robust in that when the polarity of the voltage applied to the electrodes is reversed, the deposited nanoparticles go back into the solution. Similarly, when a nanoparticle film deposited by electrophoresis is immersed in the solvent, the film dissolves in the solvent.

Nanoparticle films have also been formed by non-electrodeposition techniques. One such technique is dry casting where a drop of solvent having nanoparticles suspended therein is deposited on a flat substrate surface. When the solvent is allowed to evaporate, a monolayer thick nanoparticle film is formed on the substrate surface by self-assembly.

However, during solvent evaporation in dry casting, the nanoparticles tend to spread, making the uniformity of the resulting film difficult to control. This spreading takes place rapidly when fast-drying solvents, such as hexane, are used. The amount of spreading is lessened when slow-drying solvents (such as heptamethylnonane) are used; however the drying often requires too much time, and residues of the solvent may remain in the film.

Nanoparticle films formed by dry casting tend to have rough surfaces that are not flat. Moreover, the films are not robust in that they dissolve back into solution when immersed in the solvent. In addition, nanoparticle films formed by dry casting are unpatterned. Thus, a nanoparticle film formed by dry casting is generally not useful for certain applications such as use as a layer of an electronic device. Moreover, the thickness of a nanoparticle film formed by dry casting cannot be accurately controlled.

Another known non-electrodeposition technique for forming nanoparticle films is spin coating, where an amount of a suspension comprising a solvent and nanoparticles is placed onto a flat substrate surface, and the substrate is spun very rapidly to cause a flat film of the nanoparticles to be formed on the substrate surface. In some spin coating processes, the nanoparticles are spin coated with polymer precursors to form a composite film of nanoparticles and the polymer on the substrate surface. Like dry casting, the process of spin coating relies on the self-assembly of the nanoparticles to form the layer on the surface of the substrate.

Nanoparticle films formed by spin coating also tend to have rough, non-flat surfaces and are not robust in that the film dissolves back into solution when immersed in the solvent. Likewise, the thickness of the film formed on the substrate surface by spin coating cannot be accurately controlled. Moreover, nanoparticle films formed by spin coating are unpatterned, and thus would not be useful as a layer in an electronic device where a high quality patterned nanoparticle film is needed.

Another process for electrochemical deposition of a nanoparticle film onto a surface of an electrode is disclosed in Zhang et al., *Adv. Mater.* 11 (17), 1437 (1999). In this process, the reactants for forming the CdSe nanoparticles are mixed in a solution, and a pair of cadmium/gold electrodes are immersed in the solution. When a direct current (DC) voltage is applied between the electrodes, nanoparticles that are formed in the solution are deposited on the surface of one of the electrodes, specifically, the cathode. The deposition of the nanoparticles on the cathode forms a film in that the coverage of the nanoparticles over the cathode surface is substantially complete.

However, the nanoparticle films that are formed using the Zhang et al. process tend to have gaps. Also, in such films, the CdSe nanoparticles have mixed crystal structures in that all three of the CdSe nanoparticle crystalline structures are present in the film. Thus, the film has poor uniformity. Furthermore, the films deposited using this process have rough surfaces and are not robust. Additionally, the Zhang et al. process is not able to form nanoparticle films having more than one layer of the nanoparticles.

Therefore, a need exists in the art for a method of forming unpatterned and patterned nanoparticle films having multiple layers of nanoparticles, where the thickness of the film may be accurately controlled and where the films are uniform, have smooth surfaces, and are robust in that the films do not dissolve when immersed in the solvent.

SUMMARY OF THE INVENTION

The afore-mentioned need in the art is substantially met by the present invention, which is a method for forming nanoparticle films from a suspension of a substantially non-conducting nonpolar solvent and nanoparticles, each having ligands attached thereto. A pair of electrodes, each having a respective conducting film deposition surface is immersed in the suspension of the solvent and nanoparticles. A DC voltage is then applied between the respective film deposition surfaces of the pair of electrodes to cause the nanoparticles in the suspension to deposit on the respective film deposition surfaces of both electrodes.

The method of the present invention provides smooth, uniform and robust nanoparticle films whose thickness may be accurately controlled by controlling at least one of the duration of the applied DC voltage, the magnitude of the applied DC voltage, and the density of nanoparticles in the suspension. Moreover, the nanoparticle films formed by the method of the present invention may be patterned by patterning the respective film deposition surface of at least one of the pair of electrodes. The nanoparticle films that are formed may be used as layers of an electronic device.

BRIEF DESCRIPTION OF THE DRAWINGS

The present invention will now be described in detail with reference to exemplary embodiments thereof in conjunction with the accompanying drawings in which.

DETAILED DESCRIPTION OF THE INVENTION

Figure 1:
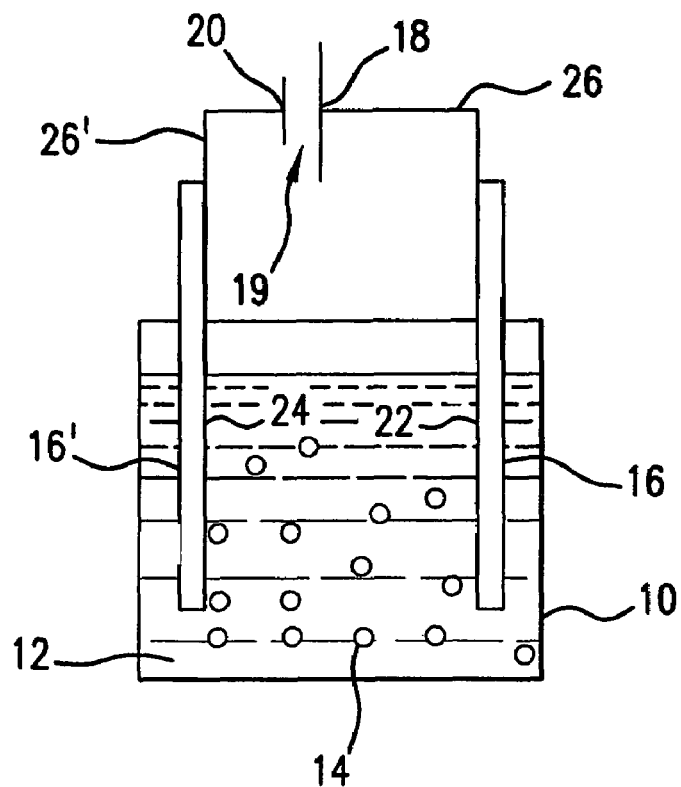
FIG. 1 depicts an exemplary apparatus for practicing the method of the present invention.

Referring to FIG. 1, there is shown a schematic diagram of an apparatus for carrying out an exemplary embodiment of the method of the present invention for forming nanoparticle films. The apparatus comprises a vessel 10 containing a substantially non-conducting nonpolar solvent 12 having ligand-capped nanoparticles 14 suspended therein. In the present embodiment, the solvent 12 is hexane and the nanoparticles 14 are nanocrystals of CdSe having a mean diameter of from about 3 nm to about 4 nm, where each nanoparticle has trioctylphosphine (TOP) ligands and/or trioctylphosphine oxide (TOPO) ligands attached thereto. When capped with TOP ligands and/or TOPO ligands, these nanoparticles are commonly termed "TOPO-capped CdSe nanocrystals." CdSe nanocrystals useful in the method of the present invention may be prepared according to the methods described in Murray et al., *J. Am. Chem. Soc.* 115, 8706 (1993), which is hereby incorporated by reference in its entirety. The concentration of the TOPO-capped CdSe nanocrystals in the hexane solvent is about $1\times10^{15}$ to about $1\times10^{16}$ nanoparticles/cc of hexane solvent.

A pair of electrodes 16 and 16' is immersed in the suspension containing TOPO-capped CdSe nanocrystals suspended in hexane. Each of the pair of electrodes 16 and 16' has a planar film deposition surface 22, 24, respectively, electrically connected to a voltage source 19 having a positive terminal 18 and a negative terminal 20, so that the film deposition surface 22 connected to the positive terminal 18 serves as the anode and the film deposition surface 24 connected to the negative terminal 20 serves as the cathode. The film deposition surfaces 22, 24 are electrically connected to the positive and negative terminals 18 and 20 of voltage source 19 by silver wires 26 and 26', which are attached to the film deposition surfaces 22 and 24 using silver paste as an electrically conducting adhesive.

In the present embodiment, film deposition surfaces 22 and 24 are parallel to one another and are separated by a distance of about 1.4 mm. When a voltage is applied by the voltage source 19 to the pair of electrodes 16 and 16', films of the TOPO-capped CdSe nanocrystals are deposited on the respective film deposition surfaces 22 and 24 of both electrodes 16 and 16'.

In this embodiment of the present invention, the voltage applied to the pair of electrodes 16 and 16' is a DC voltage. However, alternating current (AC) voltages and AC voltages having a DC component may also be used to form nanoparticle films by the present method. In the present embodiment, the applied voltage is in the range of about 100 Volts to about 1000 Volts, where the film deposition surfaces 22 and 24 of the pair of electrodes 16 and 16' are separated by a distance of about 1.4 mm. Under these conditions, the electric field in the region between the conducting film deposition surfaces 22 and 24 ranges from about 700 Volts/cm to about 7000 Volts/cm.

In the present embodiment, the DC voltage is applied to the pair of electrodes 16 and 16' for about 45 minutes with the apparatus kept in the dark and at room temperature. Additional hexane solvent is added to the suspension as needed to replenish any solvent lost through evaporation.

Figure 2:
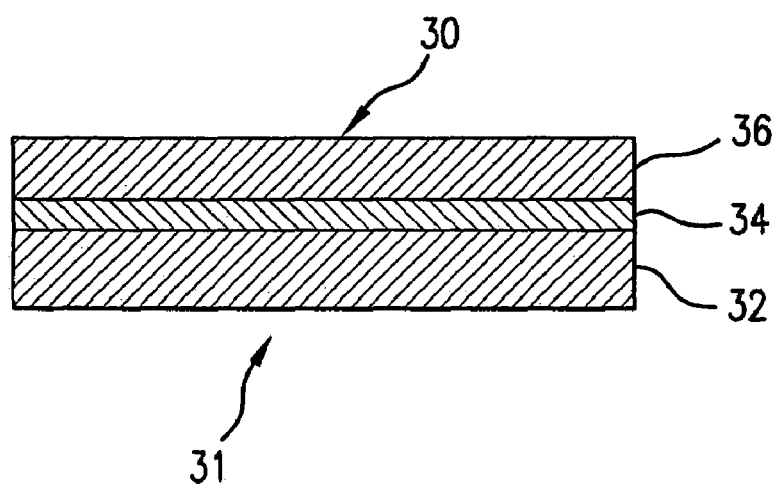
FIG. 2 depicts a flat, unpatterned gold film deposition surface of an electrode, consisting of a silicon wafer substrate coated with a 10 nm thick layer of titanium and a 150 nm thick layer of gold.

FIG. 2 shows a diagram of an exemplary electrode 31 used in the apparatus of FIG. 1 for forming flat, unpatterned nanoparticle films comprising TOPO-capped CdSe nanoparticles. The electrode 31, which has a flat, unpatterned gold film deposition surface 30, comprises a rectangular silicon wafer substrate 32 (having a (100) orientation) coated over a 0.8× 1.4 cm area of one of its surfaces with a 10 nm thick titanium layer 34. On top of the titanium layer 34 is a 150 nm thick gold layer 36, which provides the film deposition surface 30. The gold/titanium layers are electrically connected to a silver wire (not shown) using silver paste.

Figure 3:
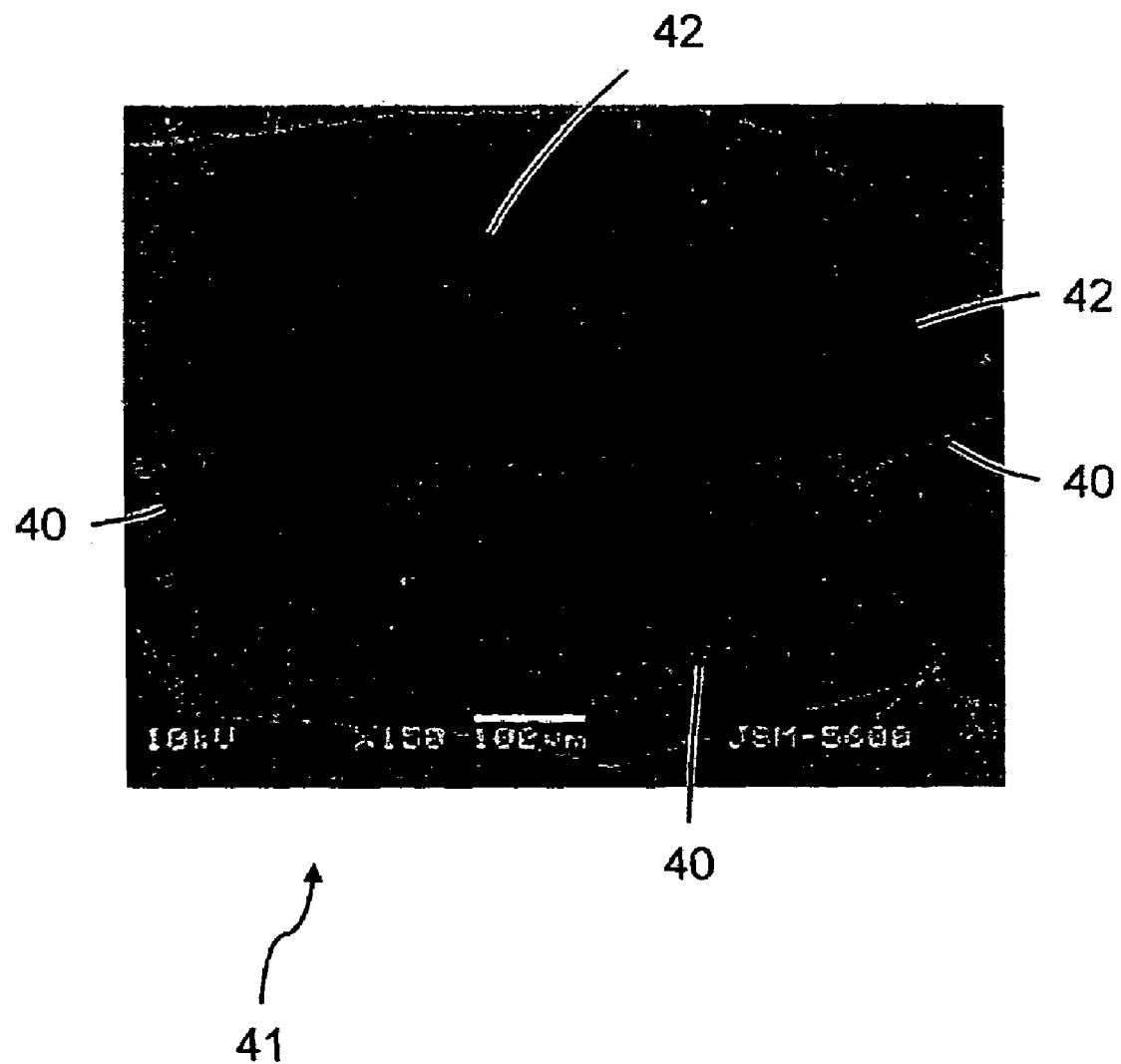
FIG. 3 is an electron micrograph of a 3.4 µm thick unpatterned nanoparticle film electrodeposited on a gold film deposition surface according to the present invention.

FIG. 3 shows an electron micrograph of a flat, unpatterned CdSe nanoparticle film 41 formed on one of the film deposition surfaces 22 and 24 of the pair of electrodes 16 and 16' of the apparatus of FIG. 1. The electrodes 16 and 16' each have the structure shown in FIG. 2. The nanoparticle film shown in FIG. 3 has a thickness of 3.4 μm.

Nanoparticle films formed according to the present embodiment, such as the film 41 shown in FIG. 3, sometimes exhibit cracking after the hexane solvent evaporates and the film dries. In FIG. 3, the CdSe nanoparticle film 41 shows some cracking, where the cracks 40 are about 5 μm wide and occupy about 4±2% of the total area of the nanoparticle film. However, the lateral dimensions of the continuous, uncracked portions 42 of the nanoparticle film exceed hundreds of microns for the film 41 shown in FIG. 3. Since uncracked portions of nanoparticle films having a length and a width of hundreds of microns, respectively, are more than sufficient for applications (such as for use as layers in electronic devices), the results shown in FIG. 3 indicate that the continuous, uncracked portions 42 of the CdSe nanoparticle film 41 could be used in device fabrication.

In addition, cracking is not always observed in nanoparticle films formed according to the present invention. For example, the patterned nanoparticle films formed on film deposition surfaces that are patterned (discussed in more detail below) typically do not exhibit any cracking because the patterned regions of these films typically have small dimensions. Furthermore, the dimensions of the continuous, uncracked portions of a nanoparticle film such as the one shown in FIG. 3 may be enlarged by changing certain conditions of the electrodeposition, such as by changing the solvent used or by using flexible electrode substrates made of polymers or the like. Additionally, both patterned and unpatterned CdSe nanoparticle films formed according to the present method and having a thickness of less than or about 0.8 μm do not show any cracking.

In the present embodiment, the concentration of CdSe nanocrystals is about $1.0\times10^{15}$ nanoparticles/cc of hexane solvent. At this concentration of nanoparticles, the initial current between electrodes 16 and 16' is about 70 nanoamps, which corresponds to a current density of about 63 nanoamps/cm$^2$. As a result of the current flow, uniform films are formed on the respective film deposition surfaces of electrodes 16 and 16'. No films were deposited in the absence of the applied voltage.

Figure 4A:
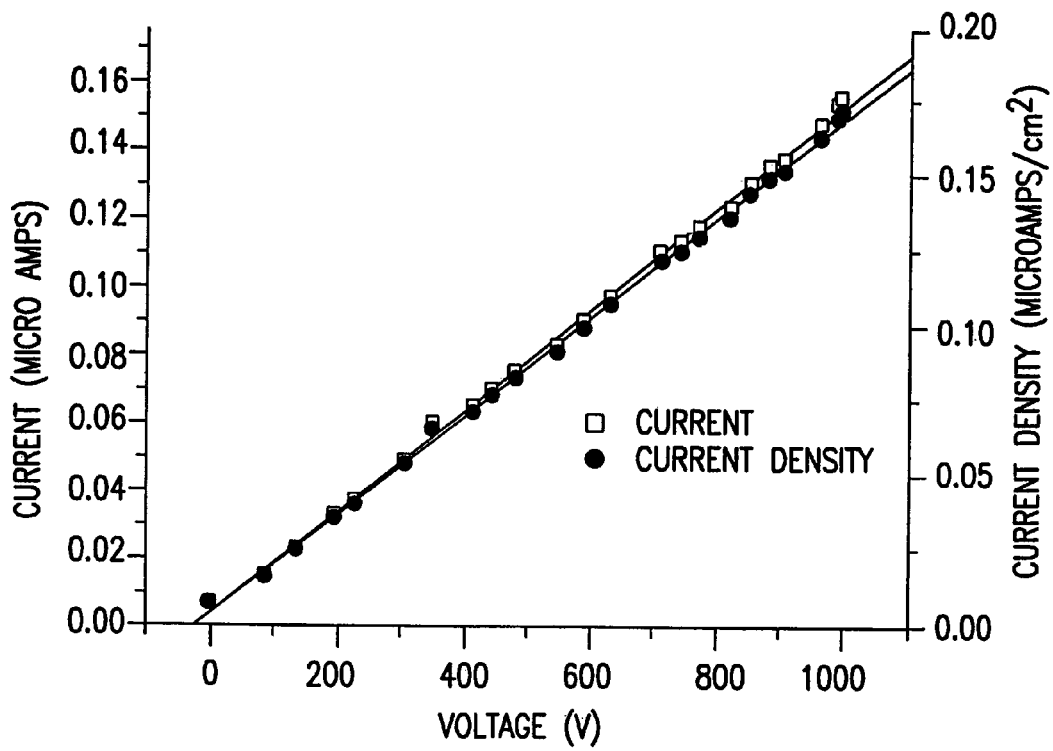
FIG. 4(A) is a graphical depiction of the current and the current density in a suspension of CdSe nanoparticles in hexane versus the applied voltage during the electrodeposition of nanoparticle films in accordance with the present invention.
Figure 4B:
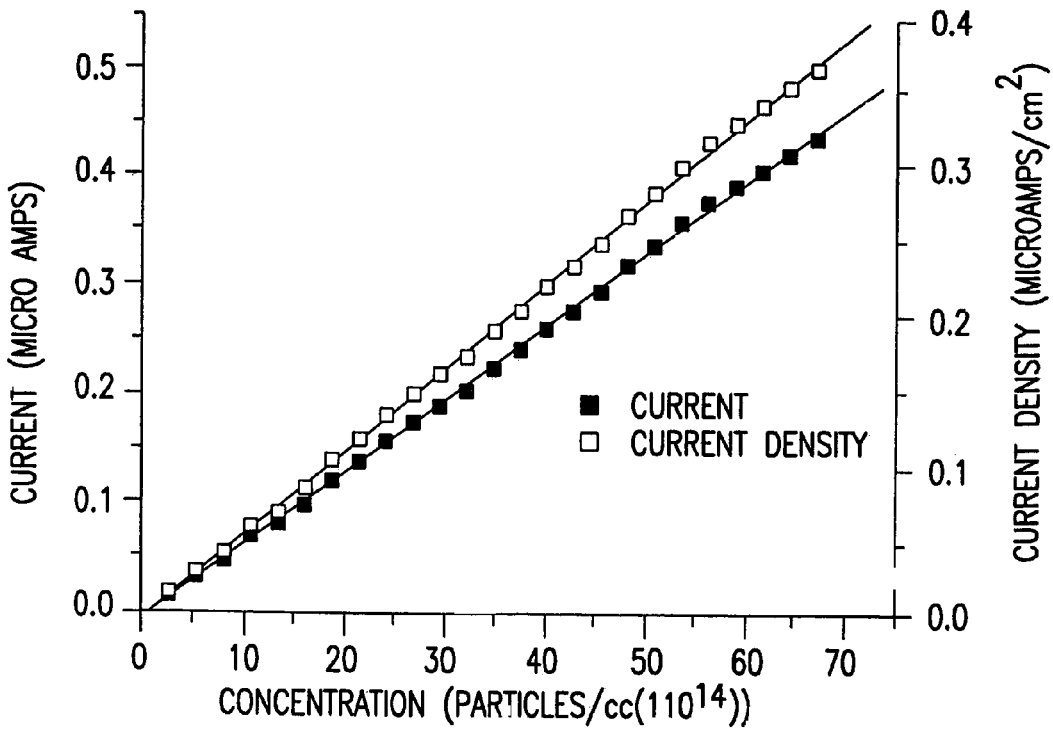
FIG. 4(B) is a graphical depiction of the current and the current density in a suspension of CdSe nanoparticles in hexane versus the concentration of CdSe nanoparticles in the suspension when a voltage of 318 Volts is applied between respective film deposition surfaces of a pair of electrodes separated by 1.4 mm to electrodeposit nanoparticle films on each of the film deposition surfaces in accordance with the present invention.

FIG. 4(A) is a graphical plot of measurements of the current and current density flowing between electrodes 16 and 16' separated by a distance of about 1.4 mm in a suspension of CdSe nanocrystals having a concentration of about $1\times10^{15}$ nanoparticles/cc of hexane solvent for different applied voltages. The data of FIG. 4(A) shows that the current and current density flowing through these suspensions at a given concentration of nanoparticles are both linearly dependent on the applied voltage. FIG. 4(B) is a graphical plot of the current and current density between electrodes 16 and 16', separated by a distance of about 1.4 mm, for an applied voltage of 318 V at different concentrations of CdSe nanoparticles in the hexane solvent.

Figure 4C:
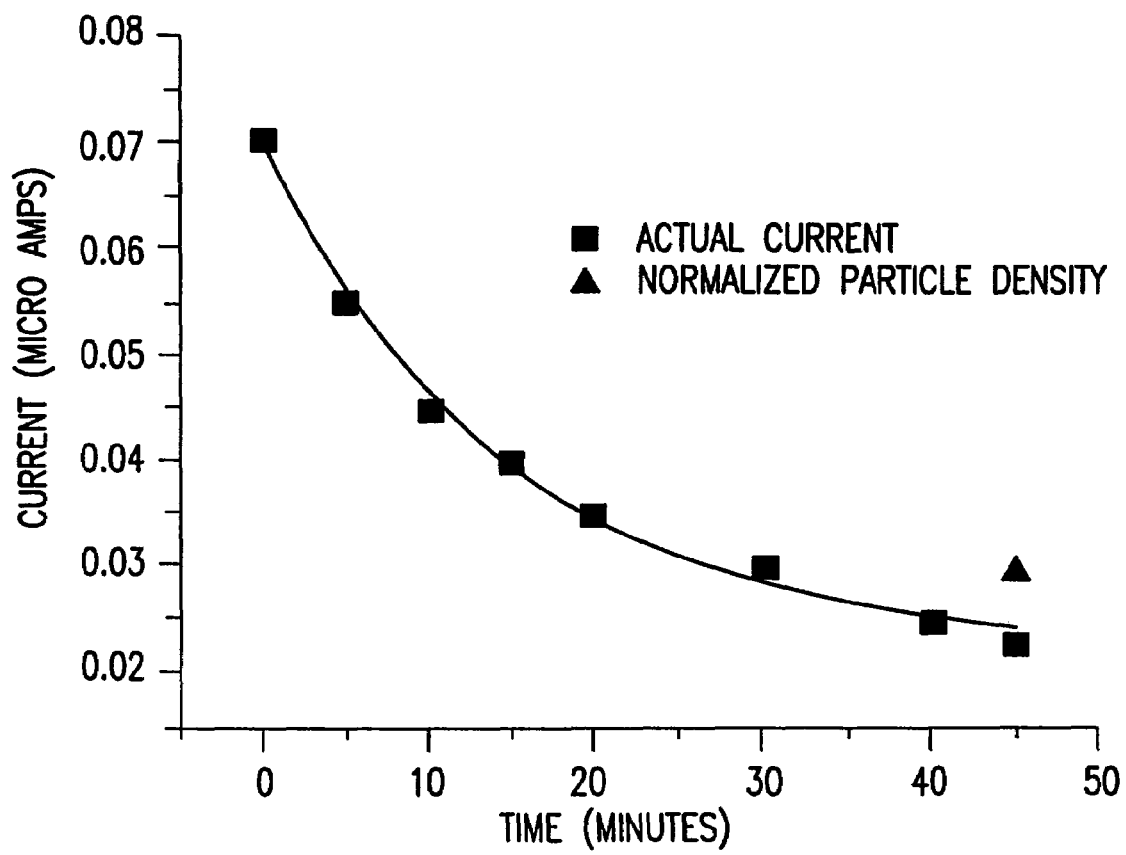
FIG. 4(C) is a graphical depiction of the current in a suspension of CdSe nanoparticles in hexane versus time during electrodeposition of nanoparticle films in accordance with the present invention.

FIG. 4(C) is a graphical plot of measurements of the current flowing between electrodes 16 and 16' as a function of time in a suspension of CdSe nanocrystals in hexane solvent having an initial concentration of $1.0\times10^{15}$ nanoparticles/cc of hexane solvent at a fixed applied voltage of about 318 V, where electrodes 16 and 16' were separated by a distance of about 1.4 mm. The data presented in FIG. 4(C) shows that the current flowing between electrodes 16 and 16' decreased from about 70 nanoamps to about 25 nanoamps over a period of about 45 minutes while the CdSe nanoparticles are being deposited from the suspension onto the respective film deposition surfaces of electrodes 16 and 16'.

Figure 5:
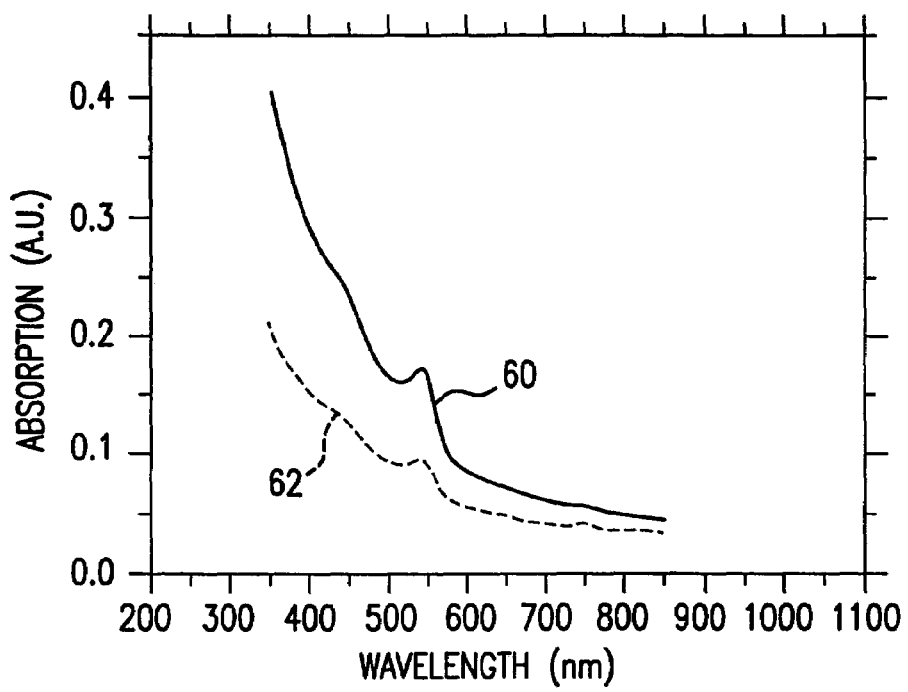
FIG. 5 is a graphical depiction of the optical absorption spectrum of a CdSe nanoparticle suspension before electrodeposition, and the optical absorption spectrum of a CdSe nanoparticle suspension after electrodeposition of CdSe nanoparticle films in accordance with the present invention.

Referring now to FIG. 5, there are shown the optical absorption spectrum 60 of the suspension of TOPO-capped CdSe nanocrystals before any electrodeposition takes place, and the optical absorption spectrum 62 of the CdSe nanoparticle suspension alter electrodeposition of flat, unpatterned CdSe nanoparticle films in the manner described above. The optical absorption data presented in FIG. 5 shows that light absorption in the suspension decreases as the concentration of the nanoparticles in the suspension decreases owing to the deposition of the nanoparticles on the respective film deposition surfaces of the pair of electrodes. The "bump" in the optical absorption spectra 60 and 62 of the suspension is on account of the band gap of the CdSe nanocrystals.

Figure 6:
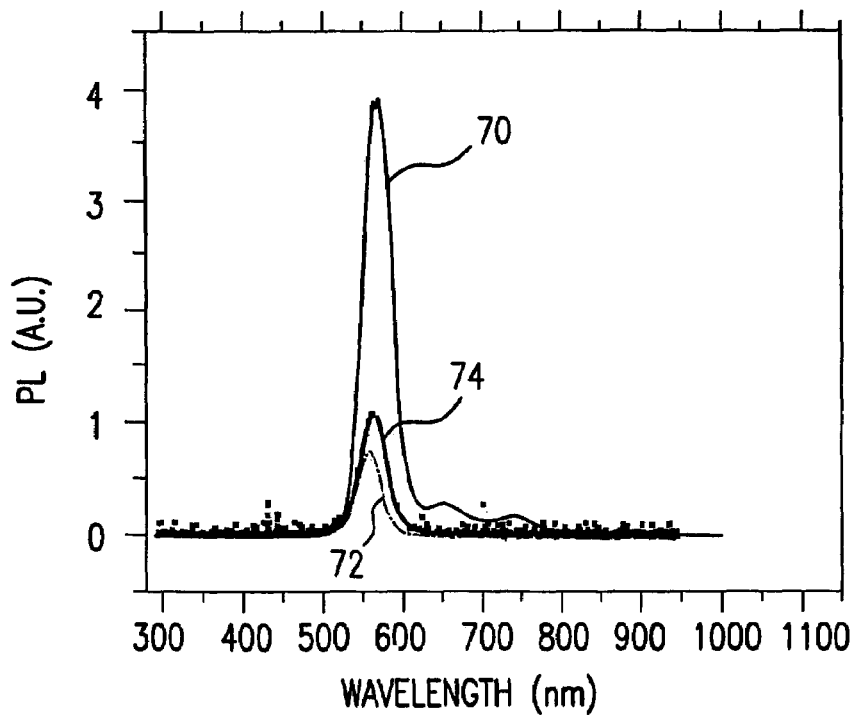
FIG. 6 is a graphical depiction of the photoluminescence spectrum of a 3.4 µm thick unpatterned film of CdSe nanoparticles electrodeposited in accordance with the present invention, the photoluminescence spectrum of a suspension of hexane and 3.2 nm diameter CdSe nanoparticles, and the photoluminescence spectrum of a 3.2 µm thick nanoparticle film formed by dry casting.

Turning to FIG. 6, there are shown the photoluminescence (PL) spectrum 70 for a flat, unpatterned CdSe nanoparticle film formed by electrodeposition in the manner described above, the photoluminescence spectrum 72 for a suspension of CdSe nanoparticles in hexane, as well as the photoluminescence spectrum 74 of a CdSe nanoparticle film formed according to dry casting. The PL spectrum 70 has a sharp peak near 567 nm, which is believed to signify exciton emission, and two smaller peaks at 654 and 745 nm, which may be due to defects in the electrodeposited nanoparticle film.

The fact that the PL spectrum 70 for the electrodeposited CdSe nanoparticle film has a very sharp peak at 567 nm indicates that the nanoparticles in the electrodeposited CdSe nanoparticle film have a narrow size distribution. A narrow size distribution of the nanoparticles may be obtained by using size selective precipitation or centrifugation at the conclusion of nanoparticle synthesis to ensure that the synthesized nanoparticles are relatively uniform in size. By using nanoparticles having a narrow size distribution, electrodeposited nanoparticle films formed according to the present invention will have a higher degree of uniformity and continuity.

The PL spectrum 72 for a suspension of TOPO-capped CdSe nanocrystals in hexane before any electrodeposition of nanoparticle films has occurred has a peak at 560 nm. This peak is also relatively sharp (similar to the PL spectrum 70 discussed above), indicating that the CdSe nanocrystals in suspension in hexane also have a narrow size distribution. The strong 567 nm peak in the PL spectrum 70 of FIG. 6 for the electrodeposited CdSe nanoparticle film shows that the properties of the CdSe nanocrystals in the electrodeposited film have not substantially changed from the properties of CdSe nanocrystals in hexane before electrodeposition. Therefore, the CdSe nanocrystals in the electrodeposited nanoparticle film formed in accordance with the present invention maintain the same size distribution, retain their ligand capping and generally do not lose the chemical and physical properties of the CdSe nanocrystals in a suspension in hexane.

The PL spectrum 74 is for a nanoparticle film formed by dry casting. This CdSe nanoparticle film was formed using the suspension of TOPO-capped CdSe nanocrystals in hexane, wherein the mean diameter of the CdSe nanocrystals is about 3.2 nm. The thickness of the nanoparticle film formed by dry casting was about 3.2 μm. As discussed above, the dry casting method simply involves allowing the hexane solvent to evaporate from the film that forms by self-assembly of the nanoparticles. The height of the peak in the PL spectrum 74 for the CdSe nanoparticle film formed by dry casting is much smaller than the peak of the PL spectrum 70 for the CdSe nanoparticle film formed by electrodeposition according to the present invention, which indicates that the films formed in accordance with the method of the present invention have a much higher density of CdSe nanocrystals than the film formed by dry casting.

In accordance with the present invention, a patterned nanoparticle film may be electrodeposited on the film deposition surface 22 and/or 24 of at least one of the pair of electrodes 16 and/or 16', where the film deposition surface 22 and/or 24 has been formed to have a desired pattern. In one exemplary embodiment, an electrode 82 having a patterned film deposition surface 80 suitable for electrodepositing a patterned nanoparticle film is shown in FIG. 7.

Figure 7:
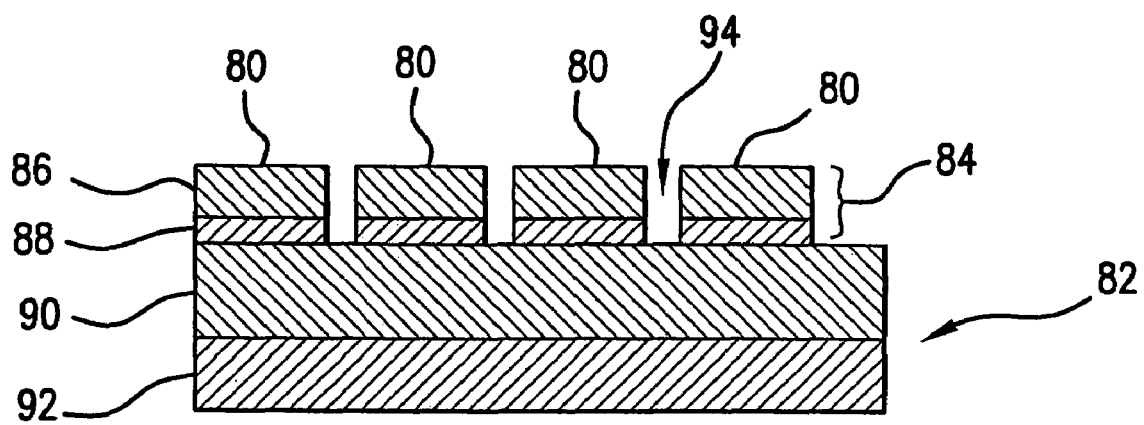
FIG. 7 depicts a patterned gold film deposition surface of an electrode, where the patterned film deposition surface consists of parallel lines of 150 nm thick layers of gold formed on top of lines of 10 nm thick layers of titanium formed on a 0.2 µm thick layer of silicon dioxide atop a silicon wafer substrate surface, where each of the gold/titanium lines is connected to one terminal of the applied voltage source.

FIG. 7 shows a patterned gold film deposition surface 80 of an electrode 82 where the patterned film deposition surface 80 consists a plurality of parallel gold/titanium lines 84 (consisting of a plurality of 150 nm thick gold lines 86 on top of respective 10 nm thick titanium lines 88) formed on a 0.2 μm thick layer 90 of silicon dioxide grown on a silicon wafer substrate 92, where the silicon wafer substrate has a (100) crystallographic orientation. The parallel gold/titanium lines 84 have different widths, ranging from about 245 μm to about 325 μm, and the spacing between the gold/titanium lines 84 ranges from about 80 μm to about 1 μm. Each of the parallel gold/titanium lines 84 is connected to one terminal of the applied voltage source using silver wire and silver paste (not shown). Thus, the conducting regions of the patterned gold film deposition surface 80 are those regions atop the parallel gold/titanium lines 84, while the insulating regions are those regions in the spaces 94 atop the silicon dioxide layer 90. The patterned film deposition surface may be formed from an unpatterned film deposition surface using conventional photolithography and etching.

In an exemplary embodiment, an electrode having a patterned gold film deposition surface, such as that shown in FIG. 7, is used as at least one of a pair of electrodes 16 and 16', where the pair of electrodes 16 and 16' is immersed in a vessel 10 containing a suspension of hexane and TOPO-capped CdSe nanocrystals and where a DC voltage provided by a voltage source 19 is applied between the pair of electrodes 16 and 16' to form a patterned CdSe nanoparticle film in the same manner as described above in connection with FIG. 1 for the electrodeposition of unpatterned nanoparticle films.

Figure 8A:
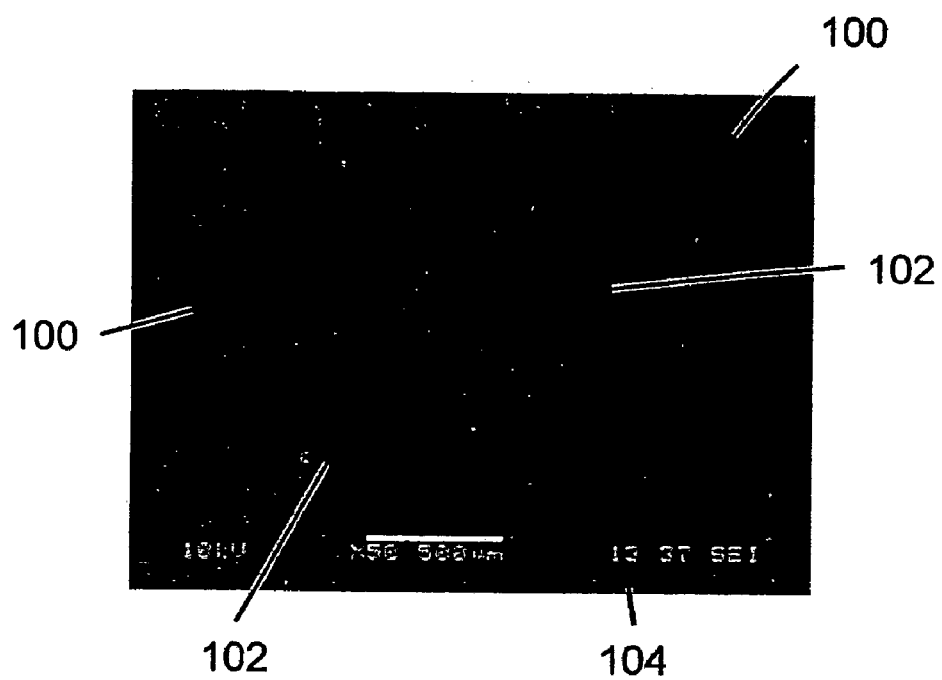
FIG. 8(A) is an electron micrograph of a patterned nanoparticle film having a thickness of 0.8 µm electrodeposited in accordance with the present invention on the patterned film deposition surface shown in FIG. 7.

Referring to FIG. 8(A), there is shown an electron micrograph of a CdSe nanoparticle film electrodeposited on the patterned film deposition surface of an electrode, such as the one depicted in FIG. 7. In FIG. 8(A), the lighter regions 100 having widths of about 245 μm to about 325 μm represent the regions of electrodeposition of the CdSe nanoparticle film on the patterned film deposition surface electrically connected to a terminal of the voltage source, while the dark regions 102 having widths of about 80 μm to about 1 μm represent the insulating silicon dioxide regions, where essentially no electrodeposition of the CdSe nanoparticles takes place. The nanoparticle film regions atop the parallel gold/titanium lines have a thickness of about 0.8 μm. Although this thickness of 0.8 μm is less than the 3.4 μm thickness of the unpatterned film described above, a nanoparticle film having a thickness of about 0.8 μm is more than sufficient for use in applications such as for use as a layer in an electronic device. Also, as earlier mentioned, nanoparticle films having a thickness of 0.8 μm tend to exhibit little to no cracking when compared to nanoparticle films that are about 3.4 μm thick.

Figure 8B:
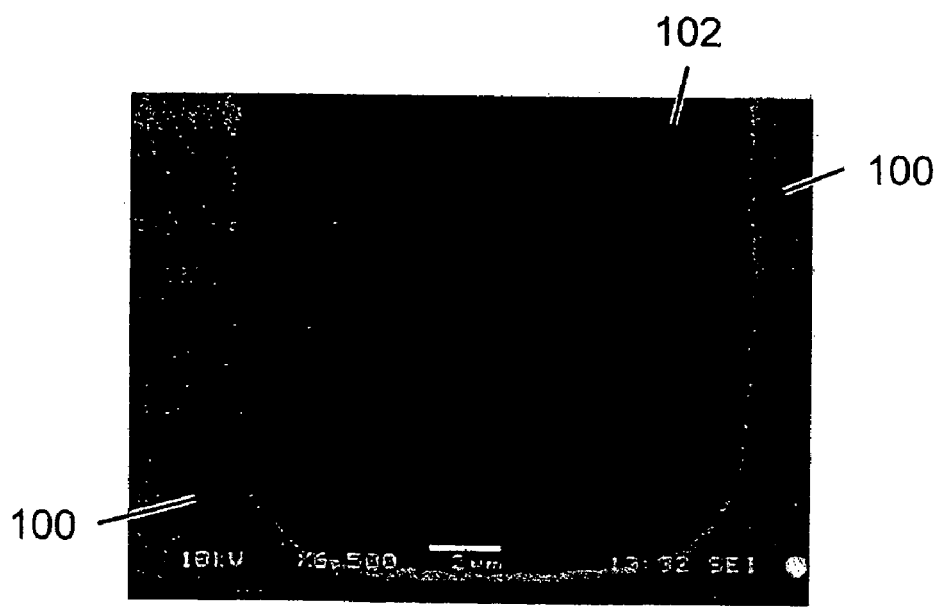
FIG. 8(B) is an expanded electron micrograph of the encircled region in FIG. 8(A), showing virtually no nanoparticle deposition on a silicon dioxide region.

FIG. 8(B) shows an expanded electron micrograph for the encircled region 104 in FIG. 8(A). This region 104 encompasses one of the dark regions 102 having a width of about 10 μm. The dark region 102 represents an insulating silicon dioxide region, where essentially no electrodeposition takes place. The 10 μm wide region 102 is located between two of the lighter regions 100 representing the regions of the electrodeposited 0.8 μm thick CdSe nanoparticle film.

Figure 9:
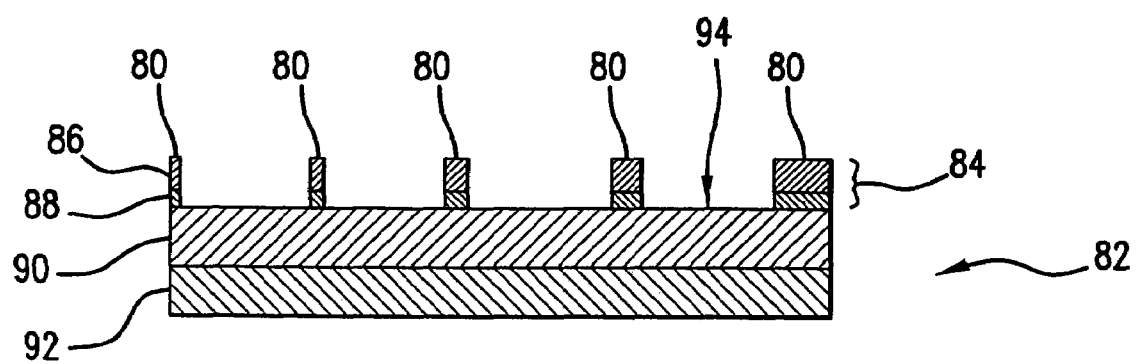
FIG. 9 depicts a patterned film deposition surface of an electrode where the patterned film deposition surface consists of parallel lines of 150 nm thick layers of gold formed on top of lines of 10 nm thick layers of titanium formed on a 0.2 µm thick layer of silicon dioxide atop a silicon wafer substrate surface, where each of the gold/titanium lines is connected to one terminal of the applied voltage source.

Referring to FIG. 9, there is shown another exemplary electrode for electrodeposition of a patterned nanoparticle film in accordance with the present invention. Like the electrode of FIG. 7, the patterned gold film deposition surface 80 of the electrode 82 in FIG. 9 consists of parallel gold/titanium lines 84 (consisting of 150 nm thick gold lines 86 atop 10 nm thick titanium lines 88) formed on a 0.2 μm thick layer 90 of silicon dioxide grown on a silicon wafer substrate 92, where the silicon wafer substrate has a (100) crystallographic orientation. Like the electrode shown in FIG. 7, the film deposition surface is formed by patterning an unpatterned gold on titanium layer using conventional photolithography and etching.

The parallel gold/titanium lines 84 have different widths, ranging from about 80 μm to about 1 μm, and the spacing between the gold/titanium lines 84 ranges from about 245 μm to about 325 μm. Each of the parallel gold/titanium lines 84 is connected to one terminal of the applied voltage source. Thus, the conducting regions of the patterned gold film deposition surface 80 are those regions atop the parallel gold/titanium lines 84, while the insulating regions are those regions of the silicon dioxide layer 90 in the spaces 94 between adjacent gold/titanium lines 84.

Figure 10A:
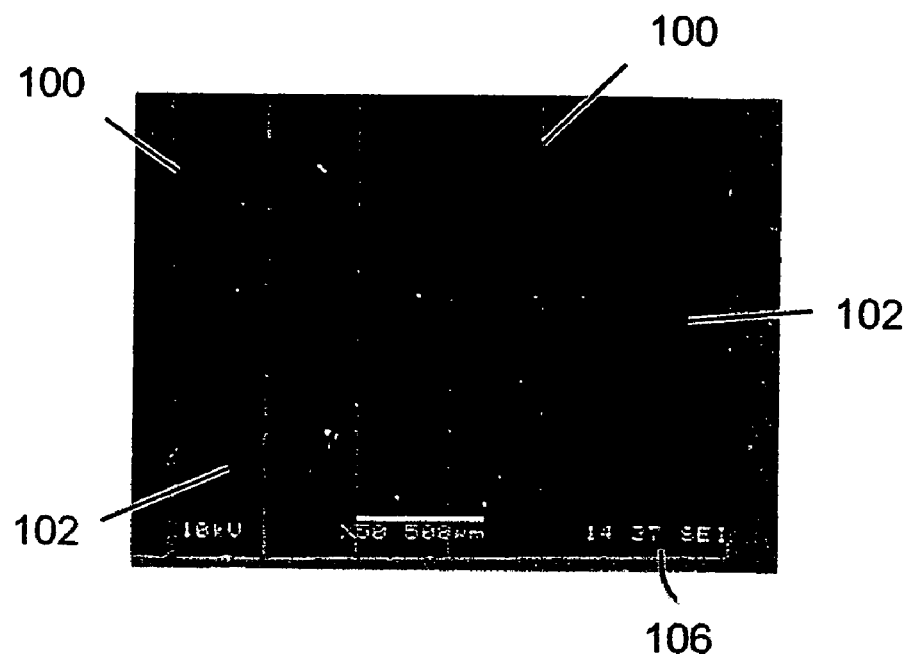
FIG. 10(A) is an electron micrograph of a patterned nanoparticle film having a thickness of 0.8 µm electrodeposited in accordance with the present invention on the patterned film deposition surface shown in FIG. 9.

FIG. 10(A) shows an electron micrograph of a CdSe nanoparticle film formed on the patterned gold film deposition surface depicted in FIG. 9. Similarly to the micrograph of FIG. 8(A), the micrograph in FIG. 10(A) shows lighter regions 100 having widths from about 80 μm to about 1 μm, which represent the regions of where the CdSe nanoparticle film was deposited. FIG. 10(A) also shows dark regions 102 having widths from about 245 μm to about 325 μm, which represent the insulating silicon dioxide regions where essentially no electrodeposition of the CdSe nanoparticles takes place. In the lighter regions 100, the thickness of the CdSe nanoparticle film was about 0.8 μm.

Figure 10B:
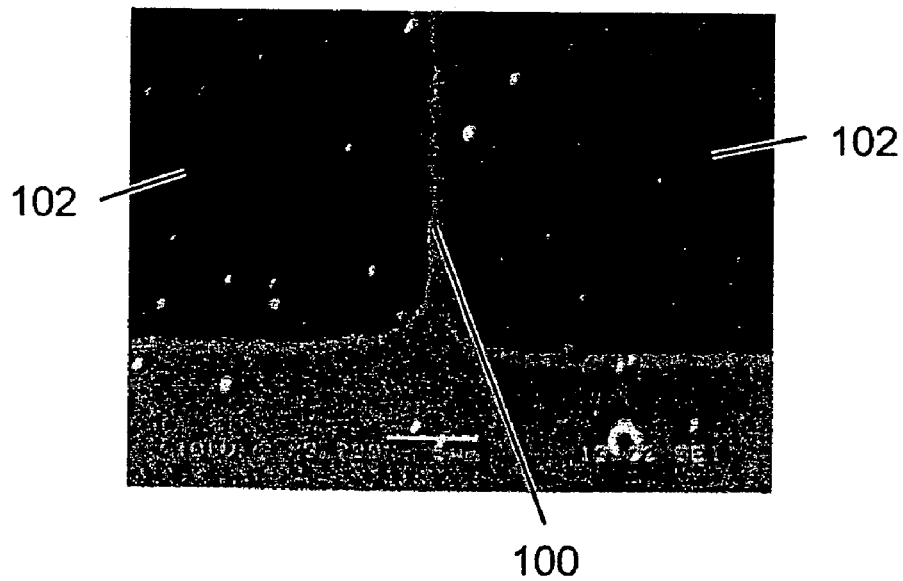
FIG. 10(B) is an expanded electron micrograph of the encircled region of the patterned film in FIG. 10(A), showing that nanoparticle deposition takes place on the patterned gold film and substantially no nanoparticle deposition takes place on the silicon dioxide regions.

Referring to FIG. 10(B), there is shown a magnified electron micrograph of the encircled region 106 in FIG. 10(A). The region that is magnified in FIG. 10(B) encompasses part of a 1 μm wide gold/titanium line having the CdSe nanoparticle film deposited thereon. The 1 μm wide line of CdSe nanoparticle film is between two darker regions 102, which represent the silicon dioxide insulating regions where essentially no electrodeposition of the CdSe nanoparticle film takes place.

Figure 10C:
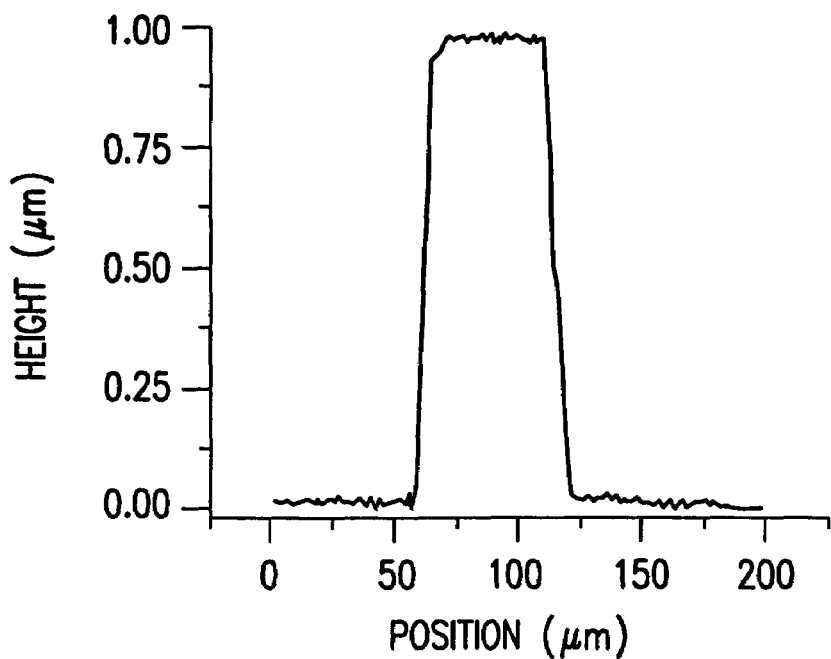
FIG. 10(C) is a profilometer trace of a 40 µm wide region of the patterned nanoparticle film of FIG. 10(A) deposited on a 40 µm wide gold/titanium line of the patterned gold/titanium film deposition surface.
Figure 10D:
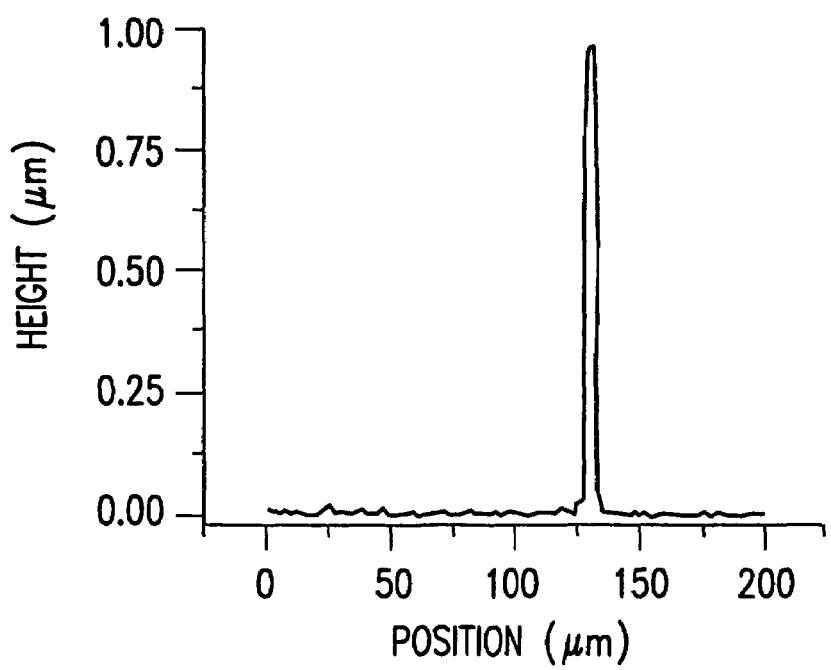
FIG. 10(D) is a profilometer trace of a 1 µm wide region of the patterned nanoparticle film of FIG. 10(A) deposited on a 1 µm wide gold/titanium line of the patterned gold/titanium film deposition surface.

In FIG. 10(C), there is shown a profilometry trace for a section of the patterned CdSe nanoparticle film that was formed on a 40 μm wide gold/titanium line of the patterned gold film deposition surface of the electrode. These profilometry measurements were taken by physically tracing the topography of selected regions of the patterned CdSe nanoparticle film, and the trace of FIG. 10(C) shows that the vertical height of the film formed on 40 μm wide gold/titanium line was measured to be about 0.8 μm. Similarly, FIG. 10(D) shows a profilometry trace for the section of the patterned CdSe nanoparticle film that was formed on the 1 μm wide gold/titanium line of the patterned gold film deposition surface of the electrode. The height of the CdSe nanoparticle film in this region was also measured to be about 0.8 μm. Although the most narrow gold/titanium line in the electrode shown in FIG. 9 has a thickness of 1 μm, it is possible to form narrower gold/titanium lines on the patterned gold film deposition surface of the electrode, using conventional photolithography and etching, and to observe nanoparticle film deposition on such narrower lines.

Figure 11A:
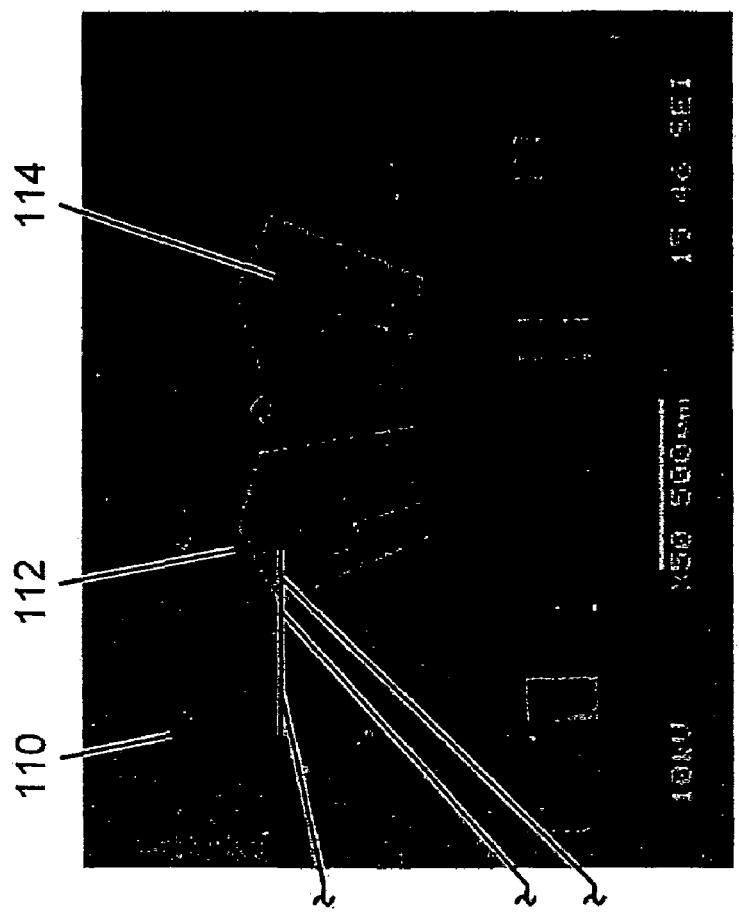
FIG. 11(A) is an electron micrograph of a patterned nanoparticle film having a thickness of about 0.8 µm electrodeposited in accordance with the present invention on a patterned film deposition surface.

Referring to FIG. 11(A), there is shown an electron micrograph of a patterned nanoparticle film electrodeposited on a film deposition surface, which had been patterned into a shape and letters using conventional photolithography and etching. The electrode used to form the nanoparticle film shown in FIG. 11(A) consists of a silicon wafer substrate having a major surface oriented in the (100) crystallographic direction coated with a 0.2 μm layer of silicon dioxide. A 10 nm layer of titanium was deposited on the silicon dioxide layer over the major surface of the silicon wafer substrate. A 150 nm gold layer was then deposited on the titanium layer, and the titanium and gold layers were then patterned by conventional photolithography and etching to form a film deposition surface having the desired shape and letters. The film deposition surface was patterned for the electrodeposition of a nanoparticle film having three distinct regions as shown in FIG. 11(A). Specifically, the film deposition surface of the electrode used for electrodeposition of the film shown in FIG. 11(A) has three types of regions: regions where the silicon dioxide layer is topped with gold/titanium layers, and the gold/titanium layers are electrically connected to one terminal of the voltage source; regions where no gold/titanium layers are formed atop the silicon dioxide layer; and regions where gold/titanium layers are formed atop the silicon dioxide layer, but where the gold/titanium layers are not electrically connected to the voltage source.

Thus, the nanoparticle film which is electrodeposited on the above-described patterned film deposition surface, as depicted in the micrograph of FIG. 11(A), shows three types of regions: the darker grey regions 110 representing the regions where nanoparticle film deposition occurred as a result of these regions of the film deposition surface being electrically connected to one terminal of the voltage source; the black regions 112 representing the regions where essentially no nanoparticle film deposition took place atop the silicon dioxide insulating regions; and the lighter grey regions 114 representing the regions where essentially no nanoparticle film deposition took place atop the gold/titanium layers that were not electrically connected to the voltage source. The regions 114 are electrically isolated from the regions 110, since they are surrounded by the insulating regions 112 where essentially no nanoparticle film deposition took place atop the silicon dioxide layer in the insulating regions 112.

Figure 11B:
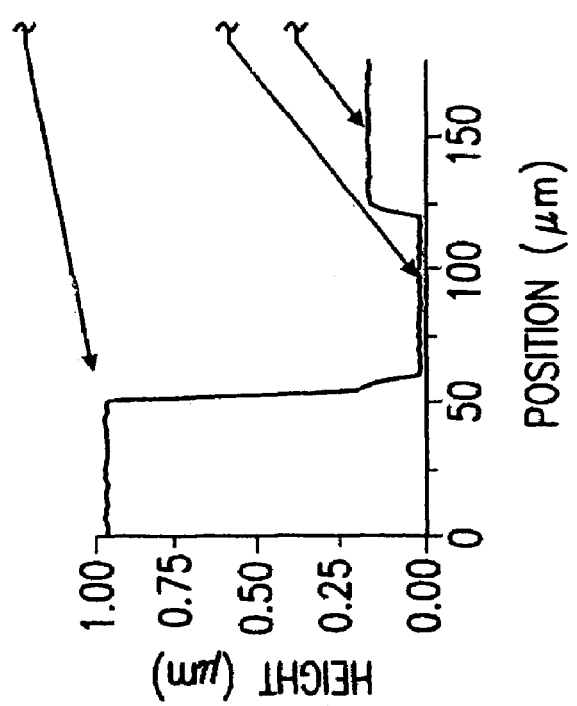
FIG. 11(B) is a profilometer trace of the three distinct regions of the patterned nanoparticle film shown in FIG. 11(A)

The profilometry trace shown in FIG. 11(B) shows the respective heights of the three types of regions of the nanoparticle film shown in FIG. 11(A). For regions 110, the height of the nanoparticle film is about 0.8 μm, whereas the very low profilometry readings for regions 112 indicate no nanoparticle film deposition on the silicon dioxide layer therein. Likewise, the profilometry height measurements for regions 114 indicate that essentially no nanoparticle film deposition took place on the gold/titanium regions of the patterned film deposition surface that were not electrically connected to the voltage source.

Figure 12:
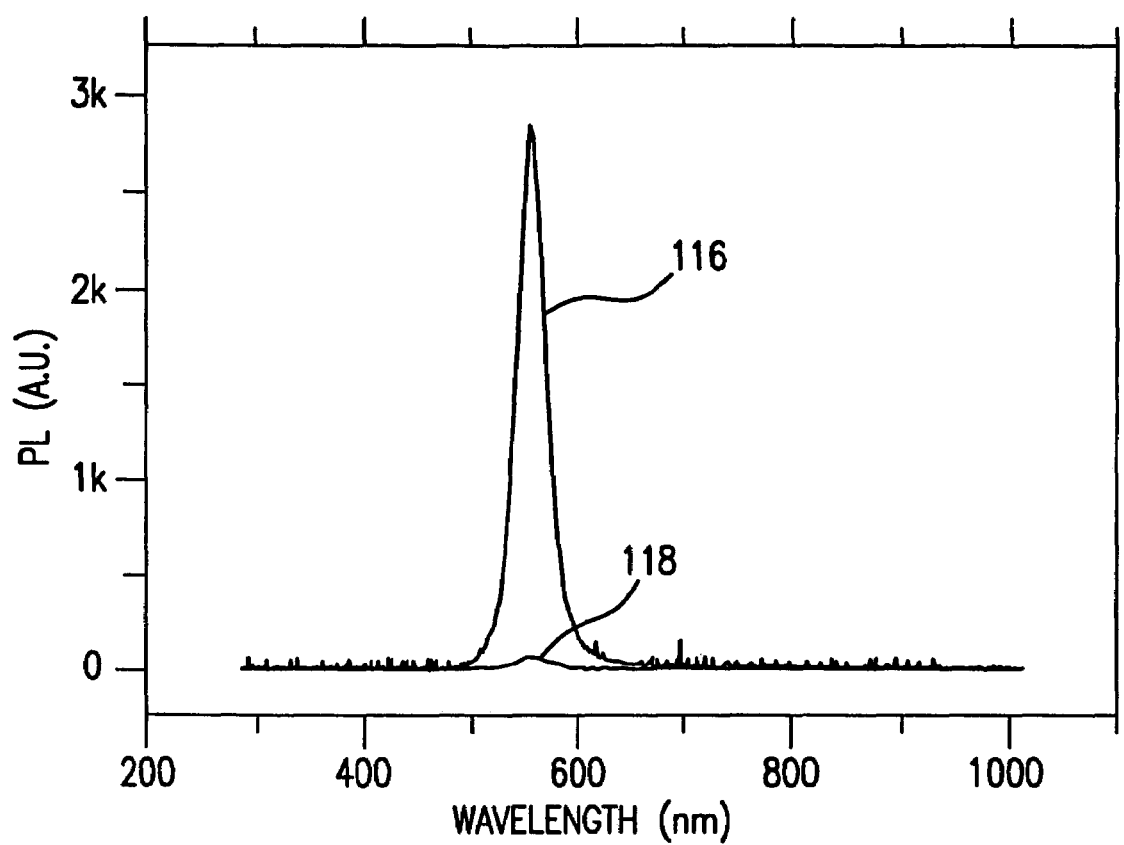
FIG. 12 is a graphical depiction of the photoluminescence spectrum of the three distinct regions of the patterned nanoparticle film shown in FIG. 11(A).

Referring to FIG. 12, there are shown the photoluminescence spectra 116 and 118 for the patterned CdSe nanoparticle film shown in FIG. 11(A). In FIG. 12, the PL spectrum 116 is for the regions 110 where the nanoparticle film was deposited. Photoluminescence spectra 118 are for regions 112 and 114 where essentially no nanoparticle film deposition took place. The PL spectrum 116 is at least 50 times stronger than the PL spectrum 118, further indicating that essentially no electrodeposition of the CdSe nanoparticle film took place on regions 112 and 114 shown in FIG. 11(A).

Not wishing to be bound by theory or any mechanism, it is believed that in a suspension of ligand-capped nanoparticles in a non-conducting, nonpolar solvent, the nanoparticles, such as CdSe nanocrystals, have a permanent dipole moment, and a fraction of the nanoparticles are thermally charged. These concepts are discussed in Blanton et al., *Phys. Rev. Lett.* 79 (5), 865 (1997) and Shim et al., *J. Chem. Phys.* 111 (15), 6955 (1999), which are hereby incorporated by reference in their entirety. In certain embodiments of the present invention, the DC electric field generated by the DC voltage applied across the electrodes immersed in the suspension acts to transport the charged CdSe nanocrystals to the conducting regions of a film deposition surface on an electrode to form nanoparticle films of controllable and equal thickness on the film deposition surfaces of both electrodes of a pair of electrodes connected to terminals of opposite polarity of the applied voltage source, suggesting equal densities of positively and negatively charged nanoparticles in the suspension, unlike conventional electrophoretic deposition techniques. The charged particles may be locally and selectively transported to the film deposition surfaces of both of a pair of electrodes by the DC electric field between the electrodes for spatially controllable assembly of the films when patterned electrodes are used.

While films are being electrodeposited according to the present method, it is believed that the observed current is due to the flow of, for example, the positively charged nanoparticles to the electrode connected to the negative terminal of the voltage source, with a flow of the negatively charged nanoparticles to the electrode connected to the positive terminal of the voltage source. The deposition of films halving the same thickness on both electrodes suggests that the densities of positively charged and negatively charged nanoparticles in the solution are equal.

The deposition method described herein is applicable to many or all nanocrystals, nanorods, and mixtures thereof, since thermal charging appears to be very common. Using the method of the present invention, simultaneous deposition of patterned films on both electrodes is feasible, possibly subject to differences in the areas of the film deposition surface of the two electrodes. It is expected that ordered layers would form for slower deposition rates and very thin films.

For comparison, the current and current density were measured of just the hexane solvent (without any nanoparticles), and the current density in the hexane solvent was found to be about 0.45-0.90 nanoamps/cm$^2$ for an applied voltage of 300 V, where the electrodes were separated by a distance of about 1.4 mm. This measured current density is about 100 times smaller than the measured current density after the CdSe nanocrystals had been added into the hexane suspension for electrodepositing the films on the film deposition surfaces of the electrodes. Similarly, for comparison, the current and current density were measured of only TOPO dissolved in hexane (using TOPO at a mass of about half that of the usual nanocrystal mass) with no nanocrystals present, and the current density was found to be about 2.7-3.6 nanoamps/cm$^2$, which is about 20 times smaller than the measured current density with the nanoparticles added to the suspension.

Returning to FIG. 1, uniform, apparently identical, films were formed on the unpatterned film deposition surfaces 22 and 24 of both electrodes 16 and 16'. No nanoparticle films were formed without the applied voltage. Visible microscopy, scanning electron microscopy (SEM), profilometry, and atomic force microscopy (AFM) showed that the surfaces of both of the films were very smooth, having a roughness value of only about 2-4 nanoparticles (corresponding to a roughness of about 8-16 nm) for a film that was about 1000 nanoparticles thick.

The initial deposition rate of nanoparticle films during the method of the present invention is typically about 3.3 nm/second for a suspension of CdSe nanocrystals in hexane at a concentration of about $1.0\times10^{15}$ nanoparticles/cc of hexane solvent and an applied voltage of 318 V between the pair of electrodes 16 and 16' separated by a distance of about 1.4 mm. This low rate of deposition indicates that the thickness of the nanoparticle films may be controlled very precisely. This rate of deposition may be decreased to an even lower value for more precise control of the formation of the nanoparticle films by decreasing the nanoparticle concentration in the suspension or by decreasing the voltage applied to the electrodes.

After a period of about 45 minutes, for the CdSe nanocrystal suspension having a density of about $1.0\times10^{15}$ nanoparticles/cc of hexane solvent, where an applied voltage of 318 V was used with the film deposition surfaces 22 and 24 of the electrodes 16 and 16' separated by a distance of 1.4 mm, nanocrystal films having thicknesses of about 3.4 µm were deposited oh the film deposition surfaces of both electrodes. Typically, the films formed within a time period of about 20 minutes. It is important to note that after the films electrodeposited in accordance with the present invention were dried, these films did not dissolve in hexane (which would occur with films formed by dry casting, spin coating and electrophoresis), even when a voltage of either polarity was applied between the electrode having the deposited film and an electrode having a bare film deposition surface.

Referring again to FIG. 6, the 27 meV red shift as between the peak of the PL spectrum 70 for the CdSe nanocrystal film formed in accordance with the present invention and the peak of the PL spectrum 74 of the suspension of the CdSe nanocrystals and hexane solvent results from transfer of excitations between the smaller nanoparticles and the larger nanoparticles. Even when the size distribution of the nanoparticles is narrow, there are some slightly larger nanoparticles (having slightly smaller band gap energies due to quantum confinement) and some slightly smaller nanoparticles (having slightly larger band gap energies). Thus, transfer of excitation occurs from these smaller particles to the larger particles and subsequently the larger particles emit PL. This causes the red shift in the PL spectral results shown in FIG. 6 for the flat unpatterned nanoparticle film. This phenomenon is described in Kagan et al., *Phys. Rev. Lett.* 76, 3043 (1996), which is hereby incorporated by reference in its entirety. The red PL shift is also seen in the weaker PL from dry cast films.

In a subsequent experiment, CdSe nanocrystal particles having a diameter of about 3.2 nm, capped with TOPO ligands, were dissolved in octane as the solvent, rather than the hexane used above. The initial current decreased from about 70 to about 55 nanoamps when octane was used as the solvent.

Also, experiments were performed using CdSe nanocrystal particles having a diameter of about 4.1 nm, and the current per unit nanoparticle density was about 3 times larger for these larger 4.1 nm-diameter nanoparticles in hexane as the solvent. Additionally, the deposition rate per unit nanoparticle density was a bit larger for these 4.1 nm-diameter nanoparticles. Specifically, the thickness rate of the film increased by about 2.2 times the rate described above using 3.2 nm nanocrystals.

In addition, experiments were performed using silicon electrodes having native oxide film deposition surfaces and with the voltage applied to the underlying silicon. For these experiments performed with a different type of electrode, the current was the same, but the deposited nanocrystal film was a bit thinner (i.e., it had a thickness of about 1.8 µm in the thickest region), and the resulting film was very rough with some areas of the film deposition surface having no film deposited thereon. The conductivity of the silicon electrodes covered by layers of native oxide is lower than the gold electrodes used in the embodiments shown in FIGS. 2, 7 and 9. Thus, the use of silicon electrodes having silicon dioxide film deposition surfaces is not preferred in the method of the present invention.

Throughout the formation of the nanoparticle films according to the present invention, the loss of the nanoparticles from the suspension due to deposition of the nanoparticles on the film deposition surfaces of the electrodes was tracked using light absorption, since the light absorption in the suspension is proportional to the density of the nanoparticles therein. The number of nanoparticles lost from the suspension was compared to the number of nanoparticles deposited on the film deposition surfaces of the pair of electrodes. The formula for determining the number, M, of nanoparticles deposited is as follows: $M=0.74At(4\pi^3/3)$, where A represents the total electrode area, t is the film thickness (which was the same for each electrode), R is the effective radius of each nanoparticle including the capping ligand (which was 2.15 nm for the 3.2 nm diameter nanoparticles as measured from the dried films), and the factor of 0.74 assumes face-centered cubic (fcc) packing.

The estimated number of nanoparticles in the films was a bit smaller than the number lost from the suspension, by about 24%. This difference may be attributable to systematic errors in the light absorption cross-section and particle diameter, less than close-packing densities, and film cracking Using either method, more nanoparticles were deposited than elementary charges collected. For example, for the 3.2 nm-diameter nanoparticles, the ratio of nanoparticles deposited to charges collected was measured to be about 44:1, 30:1, 28:1, 21:1, and 13:1 over 10, 20, 30, 45 and 90 min runs, respectively, which corresponds to an average ratio of about 27.2:1. These results show that the deposition rate decreased even faster than the current. The ratio was about 6.6 for the 4.1 nm-diameter nanoparticles at 45 minutes.

In all of the exemplary embodiments described above for electrodeposition of CdSe nanoparticles, "cleaned" CdSe nanoparticles were used, meaning that after the synthesized nanoparticles were first centrifuged, the nanoparticles underwent at least three cycles of dissolution in hexane and chloroform solvent and centrifugation, to remove impurities such as free TOPO. When "uncleaned" 3.2 nm-diameter CdSe nanoparticles were used, it was found that the current through the suspension, as measured between electrodes 16 and 16', was initially the same, but the current decreased much more slowly over time than the rate of decrease shown by the data in FIG. 4(C). Furthermore, when "uncleaned" nanoparticles were used, deposition of nanoparticles took place only on the film deposition surface of the electrode connected to the positive terminal of the applied voltage source, and the deposited nanoparticles were clustered rather than in a uniform film, with only about 0.4 nanoparticles collected per elementary charge. It is believed that the impurities in the suspension, such as free TOPO, interfered with the deposition process and may have produced positive counter ions.

When silicon electrodes having native silicon dioxide overlayers and "uncleaned" CdSe nanoparticles were used, the initial current flowing in the suspension between the electrodes was again the same as when "cleaned" CdSe nanoparticles were used; however, only about 0.05 nanoparticles were collected per elementary charge. In an experiment where TOPO was dissolved in a suspension of "cleaned" CdSe nanoparticles and hexane, the current flowing through the suspension between the electrodes remained unchanged from that of the same suspension without the addition of free TOPO; however, the CdSe nanoparticles were deposited in clumps on the film deposition surfaces of both electrodes. From examining the particle balance in the suspension, it was found that only about ⅓ of the volume of these clumps were the CdSe nanoparticles; thus, the free TOPO clearly interfered with the deposition process, but not with the flow of ions in the suspension or with the charge transfer occurring at the electrodes.

The initial conductivity, $\sigma$, of the 3.2 nm CdSe nanoparticle/hexane solution was found to be $\sigma=2.75\times10^{-9}$ ohm$^{-1}$ m$^{-1}$. The conductivity of a suspension of $n_{charged}$ nanoparticles, each with charge e, is given by the Nernst-Einstein equation, $\sigma=n_{charged}e^2/6\pi\eta R$, for hard spheres with hydrodynamic radius R, where R is about 2.15 nm for a CdSe nanocrystal including the TOPO ligand capping and where $\eta$ is the viscosity coefficient of the suspension, which is $3.26\times10^{-4}$ N s/m$^2$.

If there are positively charged nanoparticles and negatively charged nanoparticles with densities $n_+$ and $n_-$, respectively, then the density, $n_{charged}$, of both positively and negatively charged nanoparticles is given by $n_{charged}=n_++n_-$. If there are no other ions, then the equal film thicknesses observed on both electrodes suggest equal densities of oppositely charged nanoparticles where $n_+=n_-=n_{charged}/2$. Taking e as the elementary charge, solving the Nernst-Einstein equation for $n_{charged}$ gives $n_{charged}=1.4\times10^{12}$/cc, which means that for a suspension having a CdSe nanoparticle concentration of about $1.0\times10^{15}$ nanoparticles/cc of hexane, only about 0.14% of the CdSe nanocrystals are charged, half positively and half negatively. If a larger charge per nanoparticle were assumed, $n_{charged}$ would be smaller and the ratio of the number of deposited nanoparticles per charged nanoparticle would be larger.

Furthermore, if much of the voltage drop occurred near film deposition surfaces of the electrodes (as discussed in Sarkar et al., J. Am. Ceram. Soc. 79, 1987 (1996)), the conductivity in the suspension would be much larger than that calculated in the manner described above. This would make $n_+$ and $n_-$ larger, but would not change the ratio of deposited nanoparticles to charge. Additionally, when the solvent was changed from hexane to octane, the observed decrease in the current through the suspension between the electrodes was consistent with the increase in $\eta$ from $3.26\times10^{-4}$ N s/m$^2$ for a hexane suspension to $5.48\times10^{-4}$ N S/m$^2$ for an octane suspension. Furthermore, for a suspension of 4.1 nm diameter CdSe nanoparticles in hexane, a larger fraction, specifically 0.55%, of nanoparticles was found to be charged.

The energy needed to create a free charge e in a CdSe nanoparticle is approximately $(e^2/2r)(1/\epsilon_{CdSe}-1/\epsilon_{hexane})$, where r is the radius of the CdSe semiconductor core and the dielectric constants are $\epsilon_{CdSe}=9.5$ for CdSe and $\epsilon_{hexane}=2.0$ for hexane. This charging energy E is 0.17 eV for 3.2 nm diameter nanoparticles and 0.13 eV for 4.1 nm diameter nanoparticles, and the charging energy E increases as the charge is moved nearer the CdSe core surface. In equilibrium, the fraction of charged particles having a charge of either $\pm e$ would be about $\exp(-E/kT)$, which, for 3.2 nm and 4.1 nm nanoparticles are 0.15% and 0.56% at room temperature T, respectively, for these nanoparticles having their respective charges located at the center of the nanoparticles. These values are consistent with the observed charged nanoparticle density $n_{charged}/2$ taking into account the uncertainty in the location of the charges of the nanoparticles.

The volume of suspension between the electrodes in the CdSe/hexane suspension embodiments described above was 0.4% of the total volume in the container holding the suspension, and about 50% of all the 3.2 nm diameter CdSe nanoparticles were deposited on the film deposition surfaces of the electrodes in 45 minutes. Thus, about 120 times as many nanoparticles were deposited as compared to the number of nanoparticles initially between the film deposition surfaces of the electrodes. If 0.14% of the nanoparticles were charged, this means that about 360 times all initially charged nanoparticles and about 90,000 times the initially charged nanoparticles between the film deposition surfaces of the electrodes were deposited. The time needed to thermally equilibrate the charge on the nanoparticles was less than 45 min/(90,000/360) (i.e., about 10 seconds), and the time needed for diffusion between the volume of the suspension outside of the volume between the film deposition surfaces of the electrodes and the volume of the suspension between the film deposition surfaces of the electrodes was less than 45 min/120 (i.e., about 20 seconds). This represents the time needed for a particle not between the film deposition surfaces of the electrodes to come from other regions of the suspension into the region between the film deposition surfaces of the electrodes. The decrease in current with time is most likely due to the depletion of nanoparticles in suspension (and possibly the decreasing conductivity of the deposited film), and is not due to slow thermal charge generation or nanoparticle diffusion to the volume between the film deposition surfaces of the electrodes. This is also suggested by the much slower decrease in current with slow deposition rate, such as that observed when "uncleaned" nanoparticles are used. These results show that uncharged nanoparticles in the suspension become charged and move from the perimeter of the suspension into the region between the pair of electrodes to be deposited onto the respective film deposition surfaces of the electrodes.

The electric field produced by a monolayer of singly charged TOPO-capped CdSe nanoparticles is $5\times10^8$ V/m (ignoring image charges), which is about 1000 times greater than the maximum applied field, which is about $7\times10^5$ V/m; thus, charge transfer through a thick nanoparticle film and to the electrode must be fast. The conductivity of the dried CdSe nanoparticle films is very low. However, the fact that the conductivity of nanoparticle solutions increases rapidly for nanoparticle solutions comprising nanoparticle volume fractions exceeding 0.1 suggests that the solvent permeating the nanoparticle films in the solution provides a sufficient conductivity path.

Typically, nanoparticles that are useful in the method of the present invention have a diameter of from about 2 nm to about 15 nm. Other examples of nanoparticles which may be used in the present method include, but are not limited to, ferroelectric nanoparticles and paraelectric nanoparticles, each having an appropriate ligand cap. Additionally, magnetic nanoparticles, such as maghemite nanoparticles, having an appropriate ligand cap, may be electrodeposited to form a nanoparticle film in accordance with the present invention. Furthermore, nanoparticles with a "shell" around a nanoparticle core may be used; so long as a fraction of the nanoparticles are charged. For example, CdSe nanoparticles having a CdSe core and an outer shell of CdS may be electrodeposited to form films of such nanoparticles in accordance with the method of the present invention.

Where nanoparticles having a core and a shell are used, the shell prevents the charge carriers from leaving the nanoparticle core without undergoing a radiative transition. Thus, the core prevents non-radiative decay of the charge carriers contained in the nanoparticle. As a result, more charge carriers are retained in the core of a nanoparticle having a core and a shell for subsequently undergoing radiative transition. This means that nanoparticles having a core and a shell tend to luminesce more strongly than nanoparticles without a shell, making films of nanoparticles having a core and a shell especially useful as an active layer in devices such as light-emitting diodes (LEDs), in which a film's luminescent properties are especially important. A method for synthesizing nanoparticles having a core and a shell is disclosed in Peng et al., *J. Am. Chem. Soc.* 119, 7019 (1997), which is hereby incorporated by reference in its entirety.

In the exemplary embodiments of the present invention, the substantially non-conducting nonpolar solvent in which the nanoparticles are suspended is hexane or octane. However, other substantially non-conducting nonpolar solvents may be used. Specifically, the solvents that are useful in the method of the present invention, such as hexane, are very inert to the formation of anions and cations (unlike electrolytes used for electroplating) and do not contribute to the polarization of the suspended nanoparticles.

Also, in certain preferred embodiments of the present invention, the suspension of the solvent and nanoparticles has a nanoparticle concentration in the range of about $1\times10^{15}$ to about $1\times10^{16}$ particles/cc of solvent; however, suspensions having other nanoparticle concentrations may also be used.

In the method of the present invention, the nanoparticles each have ligands attached to its surface. Ligands that are useful in the present invention include, but are not limited to: trioctylphosphine (TOP); trioctylphosphine oxide (TOPO); oleic acid; tributylphosphine (TBP); tributylphosphine oxide (TBPO); pyridine; sulfur-based ligands such as thioglycerol; amine-based ligands, such as octadecylamine; heptamethylnonane; and mixtures thereof. In certain preferred embodiments, the nanoparticles used are CdSe nanoparticles each having TOP and/or TOPO ligands attached thereto.

Not wishing to be bound by theory or mechanism, it is believed that the ligands remain attached to the nanoparticles during film deposition and that the ligands of adjacent nanoparticles are adjoined. For nanoparticles of semiconductor materials, these ligands may enhance the semiconductor properties of the nanoparticle films because of the ligands' ability to trap charge carriers.

The electrodeposition of the nanoparticle films according to the present invention typically takes place at room temperature in preferred embodiments thereof. However, the temperature for the electrodeposition of nanoparticle films in accordance with the present invention may range from below room temperature to about 100° C. Not wishing to be bound by theory or mechanism, higher temperatures may increase the conductivity of the nanoparticles, thereby increasing the charge on the nanoparticles to be electrodeposited onto the conducting film deposition surfaces of the electrodes. Such an increase in charge would lead to an increase in the electrodeposition rate of nanoparticles on the conducting film deposition surfaces of the electrodes.

Additionally, in preferred embodiments of the present invention, the electrodeposition of the nanoparticle films takes place in the dark in order to prevent photoionization of the nanoparticles or light-induced charge transfer between the nanoparticles. However, electrodeposition in accordance with the present invention may also be carried out under lighted conditions, wherein no major qualitative or quantitative differences were observed in the electrodeposited nanoparticle films.

The thickness of the nanoparticle films electrodeposited in accordance with the present invention may be controlled by controlling the magnitude of the applied voltage, the amount of time during which voltage is applied to the pair of electrodes, and/or the concentration of the nanoparticles in the suspension. Typically, nanoparticle films formed according to the present invention have a thickness in the range of about 0.1 μm to about 4 μm.

The method of the present invention for forming nanoparticle films exhibits many advantages over known methods for forming nanoparticle films. For example, nanoparticle films formed according to the present method have been shown, through photoluminescence and other analyses, to retain the properties of the individual nanoparticles to a greater extent than nanoparticle films formed by known methods.

Additionally, films made according to method of the present invention are robust in that they remain stable upon rinsing with solvent, rubbing with solvent, and attempting to dissolve the film using solvent, as well as upon attempts to reverse the electrochemical process by which the films were deposited. Moreover, films formed according to the method of the present invention have a higher density than nanoparticle films formed by known methods. For example, the highest density that a tightly packed group of spherical objects may have is 74%, and the nanoparticle films formed according to the method of the present invention often have densities approaching this highest possible value.

Importantly, using the method of the present invention, nanoparticle films are formed on the film deposition surfaces of both electrodes of a pair of electrodes immersed in the nanoparticle suspension, which does not occur in any known method for electrodeposition of nanoparticle films and is an unexpected result. The nanoparticle films on the film deposition surface of each of the electrodes have substantially equal thickness and are of the same high quality with respect to retention of the properties of its constituent nanoparticles, surface smoothness, uniformity, density, and robustness.

In embodiments where unpatterned nanoparticle films are formed, it is possible to pattern these films after they are formed using conventional techniques, such as photolithography and etching.

The nanoparticle films formed according to the method of the present invention have many applications or uses. For example, semiconductor nanoparticle films may be used as active layers in solid state electronic devices, such as light-emitting diodes, and magnetic nanoparticle films, such as maghemite nanoparticle films, may be used as magnetic recording media. Nanoparticle films may also find use in electrooptical devices, in charge-storage media in microelectronic devices, in memory components in microelectronic devices, as coatings to make materials more scratch resistant, and many other such applications.

In a further exemplary embodiment of the present invention, CdSe nanocrystals, having an average diameter of about 3.2 nm, are capped with TOPO ligands and are electrodeposited onto indium tin oxide (ITO) coated transparent glass slides to form CdSe nanoparticle films. Thus, the ITO-coated surfaces of the glass slides act as the conducting film deposition surfaces, which are electrically connected to respective terminals of a voltage source so that a DC voltage is applied between the ITO-coated surfaces of the glass slides. The concentration of the CdSe nanocrystals suspended in hexane as the solvent is about $1\times10^{15}$ to about $1\times10^{16}$ nanocrystals/cc of solvent, and the ITO-coated transparent glass slides are separated by a distance of about 1.4 mm and immersed in the suspension. The DC voltage applied to the pair of ITO-coated glass slides is about 318 Volts, and the duration for the application of the voltage and for film deposition is about 30 minutes.

Nanoparticle films comprising the CdSe nanocrystals are formed on the ITO-coated surfaces of both transparent glass slides at a thickness of about 1.81 μm. The deposition of nanoparticle films on the surface of ITO-coated transparent glass slides may be controlled by controlling the amount of light passing through the transparent glass slide. The nanoparticle films formed according to the present embodiment may be used in making a light-emitting diode (LED) by depositing a conducting polymer on top of the CdSe nanoparticle film layers by spin coating. A suitable conducting polymer that may be used in forming the light emitting diode is poly[2-methoxy-5-(2'-ethylhexyloxy)-1,4-phenylenevinylene], commonly known as MBH-PPV, and commercially available from Sigma-Aldrich. The CdSe nanoparticle film layers and the layer of the conducting polymer combine to form the layers of an LED. Contacts are then formed on the CdSe nanoparticle layer and the conducting polymer layer using known techniques.

In still another embodiment of the present invention, magnetic nanoparticles are used to form a nanoparticle film. In this embodiment, maghemite ($\gamma$-$Fe_2O_3$) nanoparticles having a diameter of about 12 nm are capped with oleic acid and are dissolved to form a suspension in hexane at a concentration of $4\times10^{12}$ nanoparticles/cc of hexane. A pair of electrodes, each having a respective gold film deposition surface, are immersed in the suspension in the manner shown in FIG. 1. Each one of the pair of electrodes may have the structure described above in connection with FIG. 2.

When nanoparticle films comprising oleic acid-capped maghemite nanoparticles are formed oil the respective gold film deposition surfaces of the pair of electrodes, the nanoparticle films grow much more slowly than the CdSe nanoparticle films described above. For example, when a voltage of about 318 V is applied for 30 minutes between the respective gold film deposition surfaces of the pair of electrodes separated by a distance of about 1.4 mm in the suspension of maghemite nanoparticles in hexane at a concentration of about $4\times10^{12}$ nanoparticles/cc of hexane, the maghemite nanoparticle films formed on the film deposition surfaces of the electrodes are about 212 nm thick.

The resulting maghemite films are thinner than the 3.4 μm thick CdSe films formed in the manner described above, which are formed by electrodepositing CdSe nanoparticles onto gold film deposition surfaces of the pair of electrodes. However, conductivity measurements taken during maghemite film deposition indicate that as many as 10% of the maghemite nanoparticles are charged, as compared to 0.14% of the 3.2 nm diameter CdSe nanoparticles found to be charged in the embodiments described above.

Films formed by electrodepositing maghemite nanoparticles onto electrodes according to the present method may be useful as the recording medium in very high capacity magnetic memory devices because of the close packing of the magnetic nanoparticles on a flat surface, such as a flat unpatterned gold film deposition surface of an electrode. This is because information recording density of a magnetic memory device will be enhanced by the close packing of the maghemite nanoparticles on a flat surface, such as in a maghemite nanoparticle film formed according to the method of the present invention.

In yet another embodiment of the present invention, a mixture of nanoparticles, comprising maghemite nanoparticles having a diameter of about 12 nm, which are capped with oleic acid ligands, and CdSe nanocrystals having a diameter of about 4.1 nm, which are capped with TOPO ligands, is used to form a nanoparticle film. The mixture of nanoparticles is placed in a suspension in hexane at a concentration of maghemite nanoparticles of $4\times10^{12}$ nanoparticles/cc of hexane and a concentration of CdSe nanocrystals of $1\times10^{15}$ nanoparticles/cc of hexane. A pair of electrodes, each having a respective gold film deposition surface, are immersed in the suspension of the mixture of the nanoparticles in the manner shown in FIG. 1, and a voltage is applied between the electrodes for about 20 minutes. Each one of the pair of electrodes may have the structure described above in FIG. 2. The nanoparticle films comprising the mixture of oleic acid-capped maghemite nanoparticles and TOPO-capped CdSe nanocrystals electrodeposited onto the respective gold film deposition surfaces of the pair of electrodes are about 2.3 μm thick, and the electrodeposited nanoparticle films exhibit the properties of both the maghemite nanoparticles and the CdSe nanocrystals.

Various additional advantages and modifications will be readily apparent to those skilled in the art. Therefore, the present invention in its broader aspects is not limited by the specific details and illustrative embodiments shown and described herein. Accordingly, various modifications and alterations may be made without departing from the general inventive concept as defined by the appended claims and the equivalents.

The invention claimed is:

1. A method of forming nanoparticle films comprising the steps of:

(a) providing a suspension of a substantially non-conducting nonpolar solvent and nanoparticles, each having ligands attached thereto;
(b) immersing in the suspension a pair of spaced-apart electrodes, each having a respective conducting film deposition surface, where the conducting film deposition surface of each electrode is electrically connected to a respective terminal of a voltage source;
(c) applying a voltage between the respective conducting film deposition surfaces of the pair of electrodes so as to deposit a film of the nanoparticles on each one of the respective conducting film deposition surfaces of the pair of electrodes.

2. The method of claim 1, wherein the nanoparticles in the suspension have a narrow size distribution.

3. The method of claim 2, wherein the size of the nanoparticles in the suspension is in the range of 2 nm to 15 nm.

4. The method of claim 2, wherein the size of the nanoparticles in the suspension is in the range of 3 nm to 4 nm.

5. The method of claim 1, wherein the nanoparticles comprise at least one of nanocrystals, nanorods, or mixtures thereof.

6. The method of claim 1, wherein the nanoparticles are nanocrystals of CdSe and the ligands attached to each nanocrystal of CdSe comprise one of trioctyiphosphine (TOP) ligands and trioctyiphosphine oxide (TOPO) ligands.

7. The method of claim 1, wherein the nanoparticles are magnetic.

8. The method of claim 7, wherein the nanoparticles are maghemite ($\gamma$-$Fe_2O_3$) nanoparticles and the ligands attached thereto are oleic acid ligands.

9. The method of claim 1, wherein the nanoparticles comprise at least one of ferroelectric nanoparticles, paraelectric nanoparticles, and nanoparticles each having a core and a shell.

10. The method of claim 1, wherein the nanoparticles comprise a mixture of maghemite ($\gamma$-$Fe_2O_3$) nanoparticles having oleic acid ligands attached thereto and CdSe hanocrystals having trioctylphosphine (TOP) ligands and/or trioctyiphosphine oxide (TOPO) ligands attached thereto.

11. The method of claim 1, wherein the ligands attached to each one of the nanoparticles are selected from the group consisting of: trioctylphosphine (TOP) ligands; trioctylphosphine oxide (TOPO) ligands; oleic acid ligands; tributylphosphine (TBP) ligands; tributylphosphine oxide (TBPO) ligands; pyridine ligands; sulfur-containing ligands; amine-containing ligands; heptamethylnonane ligands; and combinations thereof.

12. The method of claim 1, wherein the solvent is hexane or octane.

13. The method of claim 1, wherein the concentration of the nanoparticles in the suspension is in the range of about $1\times10^{15}$ nanoparticles/cc of solvent to about $1\times10^{16}$ nanoparticles/cc of solvent.

14. The method of claim 1, wherein the respective conducting film deposition surfaces of the pair of electrodes are flat, unpatterned gold surfaces.

15. The method of claim 14, wherein each electrode consists of a layer of gold overlying a layer of titanium overlying a major surface of a silicon substrate.

16. The method of claim 14, wherein each electrode consists of a layer of gold overlying a layer of titanium overlying a layer of silicon dioxide on a major surface of a silicon substrate.

17. The method of claim 1, wherein the respective conducting film depositions surfaces of the pair of electrodes are flat, unpatterned conducting surfaces each consisting of the exposed surface of a layer of indium tin oxide (ITO) formed on a major surface of a transparent glass slide.

18. The method of claim 1, wherein at least one of the respective film deposition surfaces of the pair of electrodes is patterned so as to cause the deposition of a patterned nanoparticle film thereon.

19. The method of claim 18, wherein at least one of the respective film deposition surfaces is patterned to have at least one conducting region and at least one insulating region.

20. The method of claim 19, wherein the at least one conducting region of the at least one of the respective film deposition surfaces is electrically connected to a respective terminal of the voltage source and each comprises a layer region of gold overlying a layer region of titanium overlying a layer region of silicon dioxide on a major surface of a silicon substrate, and wherein the at least one insulating region of the at least one of the respective film deposition surfaces comprises a layer region of silicon dioxide on the major surface of the silicon substrate.

21. The method of claim 1, wherein the voltage applied between the respective film deposition surfaces of the pair of electrodes is a direct current (DC) voltage.

22. The method of claim 1, wherein the voltage applied between the respective film deposition surfaces of the pair of electrodes is an alternating current (AC) voltage.

23. The method of claim 1, wherein the voltage applied between the respective film deposition surfaces of the pair of electrodes is a direct current (DC) voltage and the magnitude of the applied DC voltage and the spacing between the respective film deposition surfaces of the pair of electrodes are such that the electric field in a region between the respective film deposition surfaces is in the range of 700 Volts/cm to 7000 Volts/cm.

24. The method of claim 1, wherein the respective conducting film deposition surface of each of the pair of electrodes is electrically connected to a respective terminal of the voltage source by a metal wire attached at one end to the respective conducting film deposition surface with silver paste.

25. The method of claim 1, wherein the suspension and the electrodes are kept in the dark.

26. The method of claim 1, wherein the suspension and the electrodes are maintained at room temperature.

27. The method of claim 1 further comprising controlling the thickness of the nanoparticle film deposited on the respective film deposition surfaces of the pair of electrodes by controlling at least one of the duration during which the voltage is applied between the respective conducting film deposition surfaces of the pair of electrodes, the magnitude of the applied voltage, and the concentration of the nanoparticles in the suspension.

28. The method of claim 1, wherein the thickness of the nanoparticle films deposited on the respective film deposition surfaces of the pair of electrodes is in the range of 0.1 µm to 4 µm.

29. The method of claim 1, wherein nanoparticle films of equal thickness are deposited on the respective film deposition surfaces of the pair of electrodes.

* * * * *